US012755716B2

(12) United States Patent
Westerhoff et al.

(10) Patent No.: US 12,755,716 B2

(45) Date of Patent: Oct. 6, 2026

(54) CLIENT-SERVER VISUALIZATION SYSTEM WITH HYBRID DATA PROCESSING

(71) Applicant: PME IP PTY LTD, Richmond (AU)

(72) Inventors: Malte Westerhoff, Berlin (DE); Detlev Stalling, Berlin (DE)

(73) Assignee: PME IP PTY LTD, Richmond (AU)

(*) Notice: Subject to any disclaimer, the term of this patent is extended or adjusted under 35 U.S.C. 154(b) by 104 days.

(21) Appl. No.: 18/984,877

(22) Filed: Dec. 17, 2024

(65) Prior Publication Data

US 2025/0118275 A1 Apr. 10, 2025

Related U.S. Application Data

(63) Continuation of application No. 18/139,322, filed on Apr. 25, 2023, now Pat. No. 12,170,073, which is a continuation of application No. 17/574,986, filed on Jan. 13, 2022, now Pat. No. 11,640,809, which is a continuation of application No. 16/986,020, filed on Aug. 5, 2020, now Pat. No. 11,244,650, which is a continuation of application No. 16/504,146, filed on Jul. 5, 2019, now Pat. No. 10,762,872, which is a continuation of application No. 16/036,451, filed on Jul. 16, 2018, now Pat. No. 10,380,970, which is a continuation of application No. 15/450,888, filed on Mar. 6, 2017, now Pat. No. 10,043,482, which is a continuation of application No. 14/641,243, filed on (Continued)

(51) Int. Cl.

| | |
|---|---|
| ***G06T 15/00*** | (2011.01) |
| ***G09G 5/00*** | (2006.01) |
| ***G09G 5/36*** | (2006.01) |
| ***G09G 5/395*** | (2006.01) |

(52) U.S. Cl.

CPC ............ *G09G 5/006* (2013.01); *G06T 15/00* (2013.01); *G06T 15/005* (2013.01); *G09G 5/363* (2013.01); *G09G 5/395* (2013.01); *G09G 5/001* (2013.01); *G09G 2360/12* (2013.01); *G09G 2360/18* (2013.01); *G09G 2370/022* (2013.01)

(58) Field of Classification Search

CPC .......... G09G 5/006; G09G 5/363; G09G 5/39; G06T 15/00; G06T 15/005

USPC ........................................................ 709/223

See application file for complete search history.

(56) References Cited

U.S. PATENT DOCUMENTS 6,377,257 B1 * 4/2002 Borrel .................. G06T 15/005 375/E7.006

12,062,111 B2 8/2024 Westerhoff (Continued)

*Primary Examiner* — Glenford J Madamba

(74) *Attorney, Agent, or Firm* — SCI-LAW STRATEGIES, PC

(57) ABSTRACT

The invention comprises a system of client-server visualization with hybrid data processing, having a server digital data processor, that allows for server side rendering and processing image data, and client digital data processors simultaneously connected to the server, which receives messages from the clients, creates rendered images of data sets or other data processing results and sends those rendered images and results to the clients for display or further processing. Performing certain image rendering operations on either the server or the client according to which is better suited for the tasks requested by the user at any point in time, and possibly adjusting this division of work dynamically, improves rendering speed and application responsiveness on the clients.

20 Claims, 5 Drawing Sheets

Related U.S. Application Data

Mar. 6, 2015, now Pat. No. 9,595,242, which is a continuation of application No. 12/275,834, filed on Nov. 21, 2008, now Pat. No. 9,019,287.

(60) Provisional application No. 60/989,881, filed on Nov. 23, 2007, provisional application No. 60/989,913, filed on Nov. 23, 2007.

(56) References Cited

U.S. PATENT DOCUMENTS

| | | | | |
|---|---|---|---|---|
| 2002/0184238 | A1* | 12/2002 | Chylla | H04N 1/2187 |
| 2006/0214949 | A1* | 9/2006 | Zhang | G06T 15/10<br>345/629 |
| 2007/0188488 | A1* | 8/2007 | Choi | G06T 15/005<br>345/419 |
| 2008/0042923 | A1* | 2/2008 | De Laet | G06F 3/1454<br>345/1.3 |
| 2010/0060652 | A1* | 3/2010 | Karlsson | G06T 15/005<br>345/522 |
| 2022/0253967 | A1 | 8/2022 | Westerhoff | |
| 2023/0195937 | A1 | 6/2023 | Stalling | |
| 2024/0233065 | A1 | 7/2024 | Westerhoff | |
| 2024/0233131 | A1 | 7/2024 | Westerhoff | |
| 2024/0236171 | A1 | 7/2024 | Westerhoff | |
| 2024/0273238 | A1 | 8/2024 | Stalling | |

* cited by examiner

CLIENT-SERVER VISUALIZATION SYSTEM WITH HYBRID DATA PROCESSING

This application is a continuation of (1) U.S. application Ser. No. 18/139,322 Ser. No. 17/574,986 entitled Client-Server Visualization System with Hybrid Data Processing, filed Apr. 25, 2023, which claims priority to and is a continuation of (2) U.S. application Ser. No. 17/574,986 entitled Client-Server Visualization System with Hybrid Data Processing, filed Jan. 13, 2022, which issued as U.S. Pat. No. 11,640,809 on May 2, 2023, which claims priority to and is a continuation of (3) U.S. application Ser. No. 16/986,020 entitled Client-Server Visualization System with Hybrid Data Processing, filed Aug. 5, 2020, which issued as U.S. Pat. No. 11,244,650 on Feb. 8, 2022, which claims priority to and is a continuation of (4) U.S. application Ser. No. 16/504,146 entitled Client-Server Visualization System with Hybrid Data Processing, filed Jul. 5, 2019, which issued as U.S. Pat. No. 10,762,872 on Sep. 1, 2020, which claims priority to and is a continuation of (5) U.S. application Ser. No. 16/036,451 entitled Client-Server Visualization System with Hybrid Data Processing, filed Jul. 16, 2018, which issued as U.S. Pat. No. 10,380,970 on Aug. 13, 2019, which claims priority to and is a continuation of (6) U.S. application Ser. No. 15/450,888 entitled Client-Server Visualization System with Hybrid Data Processing, filed Mar. 6, 2017, which issued as U.S. Pat. No. 10,043,482 on Aug. 7, 2018, which claims priority to and is a continuation of (7) U.S. application Ser. No. 14/641,243 entitled Client-Server Visualization System with Hybrid Data Processing, filed Mar. 6, 2015, which issued as U.S. Pat. No. 9,595,242 on Mar. 14, 2017, which claims priority to and is a continuation of (8) U.S. application Ser. No. 12/275,834 entitled Client-Server Visualization System with Hybrid Data Processing, filed Nov. 21, 2008 which issued as U.S. Pat. No. 9,019,287 on Apr. 28, 2015, which claims the benefit of priority of (9) U.S. Provisional Patent Application Ser. No. 60/989,881 filed Nov. 23, 2007 and (10) U.S. Provisional Patent Application Ser. No. 60/989,913 filed Nov. 23, 2007, the teachings of each of (1)-(10) are incorporated herein by reference in their entireties and for all purposes.

BACKGROUND OF THE INVENTION

The invention pertains to digital data processing and, more particularly, by way of example, to the visualization of 3D and 4D image data. It has application to areas including, by way of non-limiting example, medical imaging, atmospheric studies, astrophysics, and geophysics. 3D and 4D image data is routinely acquired with computer tomographic scanners (CT), magnetic resonance imaging scanners (MRI), confocal microscopes, 3D ultrasound devices, positron emission tomographic scanners (PET) and other imaging devices. Medical imaging is just one example of a market that uses these devices. It is growing rapidly, with new CT scanners, for example, collecting ever greater amounts of data even more quickly than previous generation scanners. As this trend continues across many markets, the demand for better and faster visualization methods that allow users to interact with the image data in real-time will increase.

Standard visualization methods fall within the scope of volume rendering techniques (VRT), shaded volume rendering techniques (sVRT), maximum intensity projection (MIP), oblique slicing or multiplanar reformats (MPR), axial/sagittal and coronal slice display, and thick slices (also called slabs). In the following, these and other related techniques are collectively referred to as "volume rendering." In medical imaging, for example, volume rendering is used to display 3D images from 3D image datasets, where a typical 3D image dataset is a large number of 2D slice images acquired by a CT or MRI scanner and stored in a data structure.

The rendition of such images can be quite compute intensive and therefore takes a long time on a standard computer, especially, when the data sets are large. Too long compute times can, for example, prevent the interactive exploration of data sets, where a user wants to change viewing parameters, such as the viewing position interactively, which requires several screen updates per second (typically 5-25 updates/second), thus requiring rendering times of fractions of a second or less per image.

Several approaches have been taken to tackle this performance problem. For example, special-purchase chips have been constructed to implement volume rendering in hardware. Another approach is to employ texture hardware built into high-end graphics workstations or graphics super-computers, such as for example Silicon Graphics Onyx computers with Infinite Reality and graphics. More recently, standard graphics boards, such as NVIDIA's Geforce and Quadro FX series, as well as AMD/ATI's respective products, are also offering the same or greater capabilities as far as programmability and texture memory access are concerned.

Typically hardware for accelerated volume rendering must be installed in the computer (e.g., workstation) that is used for data analysis. While this has the advantage of permitting ready visualization of data sets that are under analysis, it has several drawbacks. First of all, every computer which is to be used for data analysis needs to be equipped with appropriate volume-rendering hardware, as well as enough main memory to handle large data sets. Second the data sets often need to be transferred from a central store (e.g., a main enterprise server), where they are normally stored, to those local workstations prior to analysis and visualization, thus potentially causing long wait times for the user during transfer.

Several solutions have been proposed in which data processing applications running on a server are controlled from a client computer, thus, avoiding the need to equip it with the full hardware needed for image processing/visualization and also making data transfer to the client unnecessary. Such solutions include Microsoft's Windows 2003 server (with the corresponding remote desktop protocol (RDP)), Citrix Presentation Server, VNC, or SGI's OpenGL Vizserver. However, most of these solutions do not allow applications to use graphics hardware acceleration. The SGI OpenGL Vizserver did allow hardware accelerated graphics applications to be run over the network: it allocated an InfiniteReality pipeline to an application controlled over the network. However that pipeline could then not be used locally any longer and was also blocked for other users. Thus effectively all that the Vizserver was doing was extending a single workplace to a different location in the network. The same is true for VNC.

For general graphics applications (i.e., not specifically volume rendering applications), such as computer games, solutions have been proposed to combine two graphics cards on a single computer (i.e., the user's computer) in order to increase the rendering performance, specifically NVIDIA's SLI and AMD/ATI's Crossfire products. In these products, both graphics cards receive the exact same stream of commands and duplicate all resources (such as textures). Each of the cards then renders a different portion of the screen—or in another mode one of the cards renders every second image and the other card renders every other image. While such a solution is transparent to the application and therefore convenient for the application developers it is very limited too. Specifically the duplication of all textures effectively eliminates half of the available physical texture memory.

An object of the invention is to provide digital data processing methods and apparatus, and more particularly, by way of example, to provide improved such methods and apparatus for visualization of image data.

A further object of the invention is to provide methods and apparatus for rendering images.

A still further object of the invention is to provide such methods and apparatus for rendering images as have improved real-time response to a user's interaction.

Yet a still further object of the invention is to provide such methods and apparatus as allow users to interactively explore the rendered images.

SUMMARY OF THE INVENTION

The invention comprises, in one aspect, a system including one or more client computers that are coupled to, and can simultaneously connect with, a render server that renders and/or otherwise processes image data (including, by way of non-limiting example, 2D, 3D, and 4D medical or microscopy image data). The client computers generate messages that cause the render server to render images (or to perform other data processing tasks) and to return the results to the client computers for display or further processing. Rendering speed and application responsiveness on the client computers is improved by performing certain image rendering operations on either the server or the client, e.g., depending on which is better suited for the tasks requested by the user at any point in time, optionally, adjusting this division of work dynamically. We refer to this as client-server visualization with hybrid data processing.

In a related aspect, the invention comprises a system as described above, by way of example, wherein at least one of the client computers comprises local processing resources such as, for example, a central processing unit (CPU), a graphics processing unit (GPU), and/or a graphics library.

Such a client computer can include applications software or other functionality that generates requests for rendering one or more aspects of an image, including, by way of non limiting example, an image aspect (e.g., representing an acquired or synthesized image) and an overlay graphics aspect (e.g., representing textual or other graphical elements to be presented with the acquired/synthesized image). For example, the request to render an image aspect can include image data from a CT scan, and the request to render the overlay graphics aspect can include text (such as patient data), a ruler, a registration "cross-hair", and so forth).

Such a client computer can, further, include a render module that responds to multiple requests by the applications software (or other functionality) by effecting processing of at least one aspect of at least one of the images using the local processing resources and messaging the render server to render (or otherwise process) the other aspect(s) of that and/or other images. Thus, continuing the example, the render module can respond to requests from the applications program by (i) rendering patient-identifying text (i.e., the overlay graphics aspect) of an image using the local CPU (or GPU) and (ii) messaging the render server to render CT scan data (the image aspect) of that image.

Related aspects of the invention provide systems as described above, by way of example, wherein the render module combines aspects of an image rendered utilizing the local resources with aspects rendered by the render server. To this end, the render module can paste into a buffer the image (or other) aspect of an image returned by the render server and can add to that buffer overlay graphics (or other) aspects rendered by local resources. The render module can make that buffer available for further processing and/or display, e.g., on a monitor or other display device.

Further aspects of the invention provide systems as described above, by way of example, wherein, in addition to (or instead of) image and overlay graphics aspects, one or more requests generated by the application can be for other aspects of an image, e.g., a perspective aspect (e.g., indicating a vantage point of a viewer), and so forth. Thus, for example, requests can be for an image comprising data from a CT scan (i.e., the image aspect), along with a specified viewer vantage point or virtual camera position (the perspective aspect) and, possibly, by way of further example, additionally having patient-identifying text (the overlay graphics aspect).

As above, the client computer render module can respond to such a requests by processing those for some aspects of the image using local processing resources, while messaging the render server to process those for others. Thus, continuing the example above, the render module can respond to the requests by (i) messaging the render server to compute a slice from CT scan data, (ii) obtaining that slice from the render server and rendering it, using a local GPU, from the specified vantage point and, optionally, (iii) combining it with locally rendered text. Such re-rendering may be effected, for example, in response to user requests to zoom or pan an image (or to adjust window/level settings for such an image).

Further aspects of the invention provide systems as described above, by way of example, in which the render server comprises a module that simultaneously processes image data in response to interleaved requests from one or more client computers. A related aspect of the invention provides such a system in which the render server includes one or more central processing units that process image data in response to such interleaved requests. A still further aspect of the invention provides such a system in which the render server module maintains requests in queues on the render server. Those requests may be received directly from the client digital data processors or may be generated as a result of messages received from them.

Further aspects of the invention provide systems employing combinations of the features described above.

Still further aspects of the invention provide methods for graphics processing paralleling the features described above.

These and other aspects of the invention are evident in the drawings and in the description that follows.

BRIEF DESCRIPTION OF THE DRAWINGS

A further appreciation of the invention may be attained by reference to the drawings, in which.

DETAILED DESCRIPTION OF THE ILLUSTRATED EMBODIMENT

The construction and operation of the illustrated embodiment may be more fully appreciated by reference to commonly assigned U.S. patent application Ser. No. 12/275,421, filed Nov. 21, 2008 by Westerhoff et al., entitled "multi-User multi-GPU Render Server Apparatus and Methods", which issued as U.S. Pat. No. 8,319,781 on Nov. 27, 2012 (hereinafter, the "Related Application"), a non-provisional claiming the benefit of filing of U.S. Provisional Patent Application Ser. No. 60/989,881, entitled "multi-User multi-GPU Render Server Apparatus and Methods," the teachings of both which are incorporated by reference herein.

Overview

Figure 1:
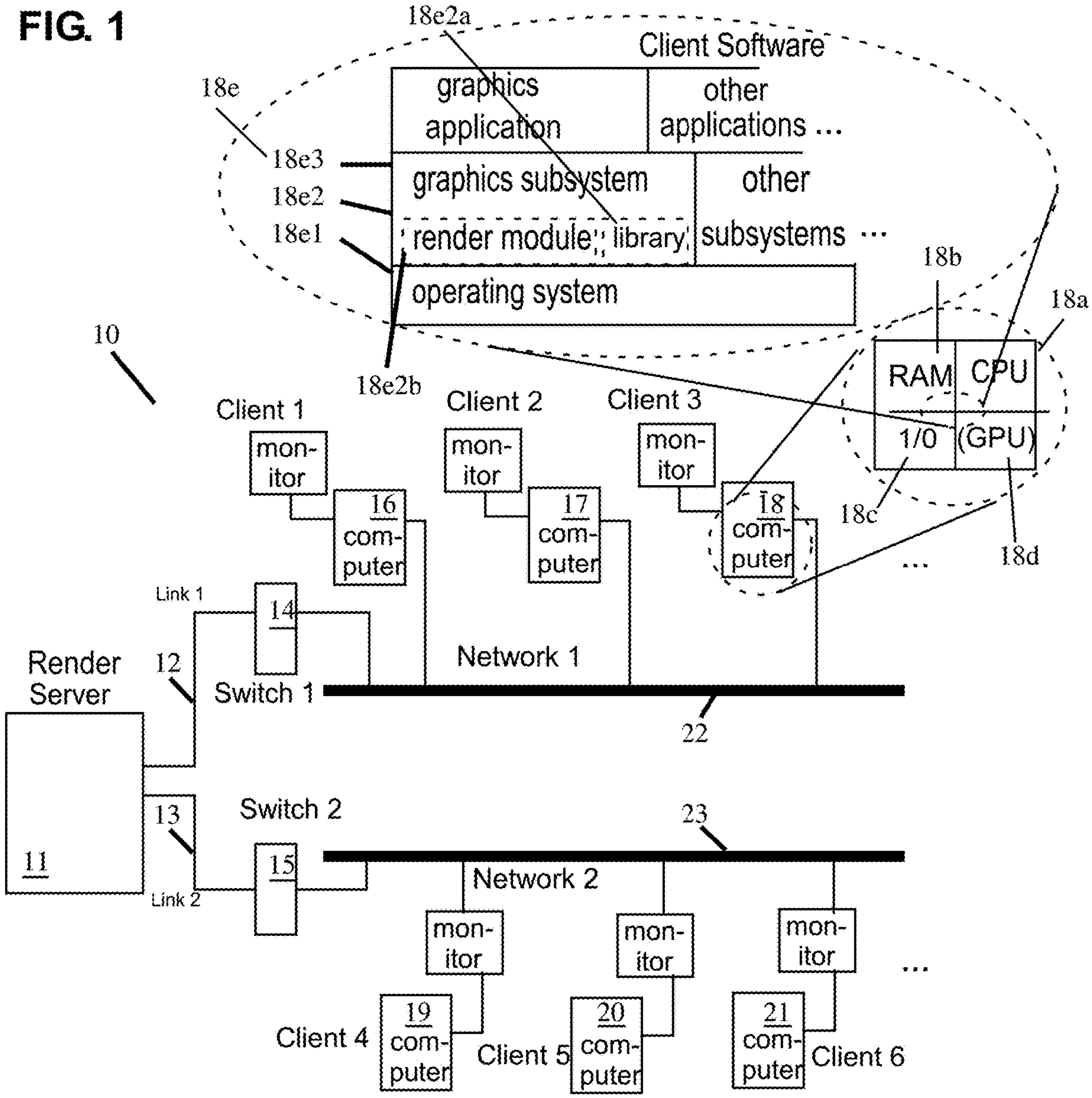
FIG. 1 illustrates a system according to one practice of the invention.

FIG. 1 depicts a system 10 according to one practice of the invention. A render server, or server digital data processor, 11 is connected via one or more network interfaces 12, 13 and network devices, such as switches or hubs 14, 15, to one or more networks 22, 23—which can be WANs (wide area networks), LANs (local area networks), or other types of networks known in the art. One or more client computers, or client digital data processors, 16-21 are coupled for communications with render server 11 via networks 22, 23.

In the illustrated embodiment, software running on client computers 16-21 allows them to establish a network connection to the render server 11 on which server software is running. As a user interacts with one of the client computers, the software on that computer messages the render server 11, which renders or otherwise processes images (or partial images) in response and returns those images (or partial images) and/or processing results to the respective client computer for further processing and/or display.

The components illustrated in FIG. 1 may be of the type generally known in the art, as adapted in accord with the teachings hereof. Thus, by way of non-limiting example, illustrated render server 11 and client computers 16-21 may comprise conventional workstations, personal computers and other digital data processing apparatus of the type available in the marketplace, as adapted in accord with the teachings hereof.

The make-up of a client computer of the illustrated embodiment is shown, by way of example, in the break-out of FIG. 1. As illustrated, client computer 18 includes local processing resources such as, by way of non-limiting example, CPU 18*a*, RAM 18*b*, I/O section 18*c* and, optionally graphics processing unit 18*d*, all configured and operated in the conventional manner known in the art, as adapted in accord with the teachings hereof. One or more of the other client computers 16-17, 19-21 may be similarly configured. As further shown in the drawing, one or more of the client computers of the illustrated embodiment can include monitors for display of images rendered in accord with the teachings hereof. The client computers may also include other output devices, instead or in addition, for display of rendered images (e.g., plotters, printers, and so forth), as well as keyboards, mice and other input devices.

Preferably, server digital data processor 11 is constructed and operated in the manner of server 11 illustrated and described in the Related Application (the teachings of which are incorporated herein by reference), as further adapted in accord with the teachings hereof. This includes, by way of non-limiting example, the construction and operations shown and discussed in FIGS. 2 and 13-17 and the accompanying text of the Related Application, which figures and text are also incorporated herein by reference. Thus, for example, a preferred render server 11 includes one or more host systems, each equipped with one or more central processing units (CPUs) that are coupled to host memory and to one or more graphics (GPU) boards. Each graphics board can, in turn, include on-board memory (referred to as graphics memory) and a graphics processing unit (GPU). In order to render an image, e.g., in response to a messaged request from a client computer, a CPU on the server 11 (i) causes a respective portion of a data set to be transferred from host memory (or an external storage device) to the graphics memories on the server and (ii) issues commands to one or more of the GPUs on the server. The resulting image generated by the GPU(s) on the server is transferred to host memory on the server and, then, via network interfaces 39, 40, to the requesting client computer. A further appreciation of these and other aspects of operation of a preferred render server 11 may be attained by reference to aforementioned incorporated-by-reference Related Application.

It will be appreciated that the system 10 of FIG. 1 illustrates just one configuration of digital data processing devices with which the invention may be practiced. Other embodiments may, for example, utilize greater or fewer numbers of client computers, networks, networking apparatus (e.g., switches or hubs) and so forth. Moreover, it will be appreciated that the invention may be practiced with additional server digital data processors. Still further, it will be appreciated that the server digital data processor 11 may, itself, function, at least in part, in the role of a client computer (e.g., generating and servicing its own requests and/or generating requests for servicing by other computers) and vice versa.

Server Software and Client Software

Operation of the system 10 of the illustrated embodiment in regards relevant hereto is controlled by software running on render server 11 ("Server Software") and software running on one or more of the client computers 16-21 ("Client Software"), e.g., client computer 18.

The Client Software handles data processing tasks, image rendering, network communication with render server 11 and client-side display, as discussed elsewhere herein. The make-up of Client Software of the illustrated embodiment is shown, by way of example, in the break-out of FIG. 1 and its operation is detailed in the sections that follow. As illustrated, the Client Software 18*e* includes an operating system 18*e*1, a graphics subsystem 18*e*2 (optionally, among other subsystems) and a graphics application 18*e*3 (optionally, among other applications). Although the discussion in the sections of text that follow largely focuses on operation of the Client Software 18*e* of client computer 18, it will be appreciated the Client Software of one or more of the other client computers 16-17, 19-21 may be similarly constructed and operated.

The operating system 18*e*1 is constructed and operated in the conventional manner of operating systems of client devices of the type shown herein, as adapted in accord with the teachings hereof.

The graphics application 18*e*3 provides an interface by which the user interacts with a data set that he/she wishes to visualize and/or otherwise process. This includes, for example, allowing the user to choose a data set, to choose render parameters such as color or data window or the view point or camera position when visualizing (e.g., rotating) the data set. In these regards, the graphics application 18*e*3 operates in the manner of conventional graphics applications of the type known in the art.

The graphics subsystem 18*e*2 is responsible for handling image rendering requests generated by the graphics application 18*e*3 and functions at the interface between that application and the client computer's operating system 18*e*1 and hardware. In the illustrated embodiment, it includes a graphics library 18*e*2*a* with functions that are invoked directly and indirectly by the graphics application's rendering requests. In the foregoing regards, the graphics subsystem 18*e*2 can be constructed and operated in the conventional manner of graphics subsystems known in the art, as adapted in accord with the teachings hereof.

The illustrated graphics subsystem 18*e*2 also includes a render module 18*e*2*b* that is operated in accord with the teachings hereof and that effects processing of requests made by the graphics application 18*e*3 such that requests to render some aspects of a given image are resolved (i.e., rendered) using the local processing resources (such as, by way of example, CPU 18*a*, graphics processing unit 18*d* and/or graphics library 18*e*2*a*) while those for other aspects of that same image are resolved by messaging the render server for rendering or other processing by it. In the discussion that follows, operations generally attributed to the "Client Software" (e.g., of client computer 18) are performed by the render module 18*e*2*b*, unless otherwise evident from context.

The Server Software operates in connection with the Client Software, e.g., 18*e*, running on a client computer, e.g., 18, to render or otherwise process data sets designated by a user of that client computer. Thus, as the user interacts with a data set (and, more particularly, for example, requests rendering of a data set), the Client Software, e.g., 18*e*, (and, more particularly, the render module 18*e*2*b*) on the respective client computer, e.g., 18, sends messages to the Server Software which, in turn, generate images, partial images or image data and returns them to the client computer (and, more particularly, to the render module 18*e*2*b*) for display and/or further processing. In addition to performing these rendering operations, the Server Software oversees network communication, data management, and other data processing tasks (for example, filtering).

Consistent with the remarks above, the Server Software is constructed and operated in the manner described in the incorporated-by-reference Related Application, as further adapted in accord with the teachings hereof. This includes, by way of non-limiting example, the construction and operations shown and discussed in FIGS. 2 and 13-17 and the accompanying text of the Related Application, which figures and text are also incorporated herein by reference.

Thus, though not a requirement of the invention, the Client Software, e.g., 18*e*, and Server Software of the illustrated embodiment can cooperate in the manner described in incorporated-by-reference Related Application and, more particularly, by way of non-limiting example, in the manner described in connection with FIG. 13 and the accompanying text thereof, which figures and text are also incorporated herein by reference. Thus, for example, the Server Software can listen for incoming network connections and, when a client computer attempts to make such a connection, can exchange authentication credentials and can check whether sufficient resources are available on the server 11 before accepting or rejecting the connection. Once a network connection is established, the Server Software can listen for incoming messages. These may include: (i) requests for a list of data sets available on the server-potentially along with some filter criteria, (ii) requests to load a data set for subsequent rendering, (iii) requests to render a data set with specified rendering parameters and a specified resolution level, (iv) requests to terminate a given connection, (v) requests to apply a filter (for example noise removal or sharpening) etc. Received messages can be processed immediately or can be added to a queue for later processing. In the typical case in which a client computer sends a render request, the Server Software can transfer the data set in question (or portions of it) into graphics memories on the server 11, can issue commands to GPUs of the server 11 to create a rendered image in those graphics memories, and can transfer the rendered image back into host memory on server 11 for subsequent processing and network transfer back to the requesting client computer. The Server Software can, furthermore, prioritize requests added to the queue of pending requests, alter requests in the queue (e.g., remove requests which are obsoleted, break down requests into multiple smaller ones), and/or determine resources used to process a request. Though not a requirement of the instant invention, the Server Software can service such rendering requests from multiple client computers concurrently. As noted, the Client Software, e.g., 18*e*, and Server Software of other embodiments may cooperate other than in the manner described above.

The Client Software, e.g., 18*e*, and, particularly, for example, its render module 18*e*2*b*, can improve rendering speed and application responsiveness by rendering some image aspects locally and messaging the server 11 to render (or otherwise process) other image aspects. For example, in response to requests by the graphics application 18*e*3 executing on a client computer, e.g., 18, to render aspects of an image of the type shown in FIG. 2—an image that includes an image aspect including acquired or synthesized images and an overlay graphics aspect representing textual or other graphical elements to be presented with the acquired/synthesized image—the render module 18*e*2*b* can message the server 11 to render the image aspect and can utilize the CPU and/or GPU of the respective client computer, e.g., 18, to render the overlay graphics aspect. Alternatively, the render module 18*e*2*b* can cause such render requests by the graphics application 18*e*3 to be processed entirely locally or, still further, can message the render server to effect rendering entirely on that server. Thus, over the course of multiple user requests and, in turn, multiple image rendering requests by the graphics application 18*e*3 (i.e., in response to those user requests), the Client Software, e.g., 18*e*, running on a given client computer, e.g., 18, effects rendering of at least one aspect of at least one of those images on the local processing resources (such as, by way of example, CPU 18*a*, graphics processing unit 18*d* and/or graphics library 18*e*2*a*) and messages the server 11 to render (or otherwise process) the other aspect(s) of those images.

In the illustrated embodiment, decisions on whether to resolve given render requests locally (i.e., to use local resources to render an aspect of an image in response to a given request by an application) or to message the render server (i.e., to render or otherwise process an aspect of an image in response to the given request) are generally made on a request-by-request basis. However, as will be appreciated, even a single render request can result in rendering using both local resources and the render server.

More particularly, decisions on whether and how to divide responsibility for rendering (e.g., between the local resources and the render server) are made according to which (i.e., the local resources or the render server) is better suited for the requisite rendering tasks, e.g., at the point in time rendering is requested.

To these ends, the render module 18*e*2*b* has access to the internal state of the graphics application 18*e*3 (e.g., as discerned from the calls it makes to the aforementioned graphics library 18*e*2*a*), as well as other information necessary to determine how to allocate rendering and compute tasks between the respective client computer (e.g., 18) and the render server 11, e.g., so as to avoid inefficient utilization of the server on account, for example, of unnecessary network roundtrips. That "other information" includes, for example, (i) the capabilities of the local processing resources (such as, by way of example, CPU 18*a*, graphics processing unit 18*d* and/or graphics library 18*e*2*a*) of the client computer, e.g., 18, itself, (ii) the load on those resources, (iii) the throughput of the network connecting the client and server computers, (iv) the image rendering capabilities of the render server, (v) the load on the render server, (vi) the locale of data being rendered. The latter (e.g., the capabilities of, and load on, the network and/or render server) may be communicated by the render server to the client computer's render module 18*e*2*b*, e.g., in response to a query made by the latter, and/or may be discerned by the render module 18*e*2*b* based on the rapidity with which the render server responds to image-rendering messages submitted to it by the client computer.

Figure 2:
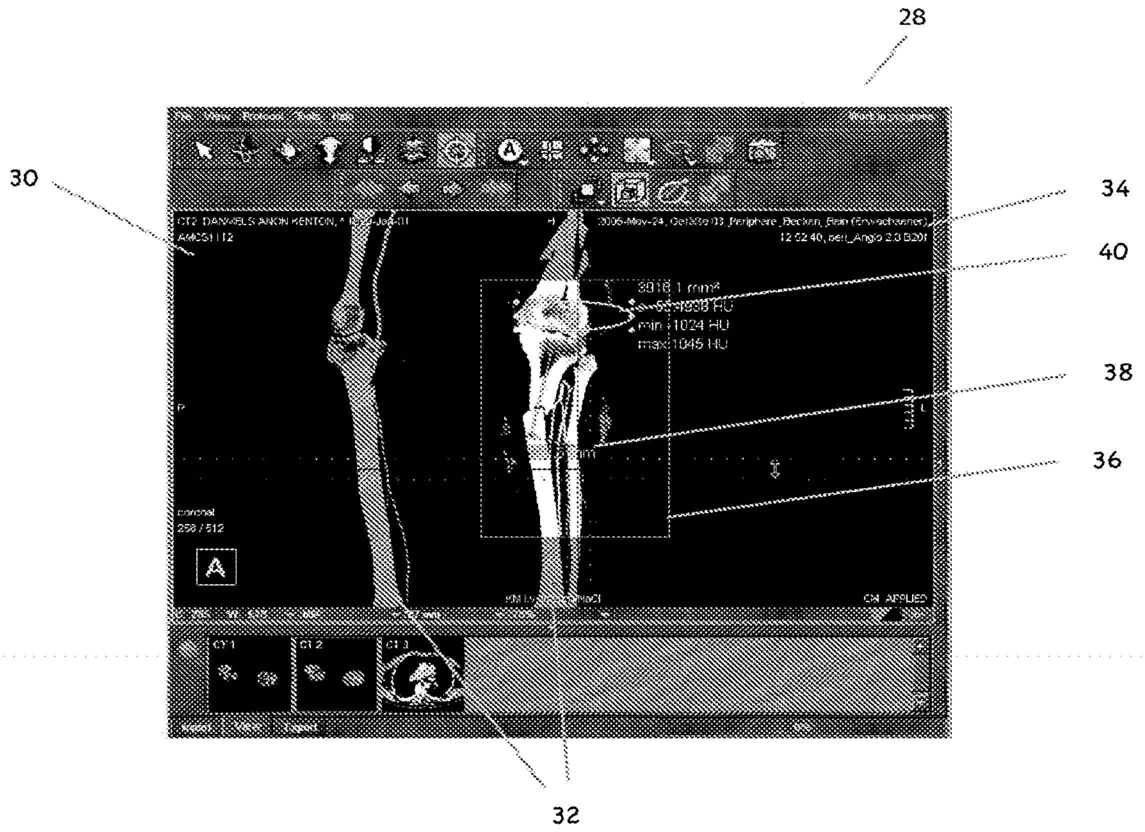
FIG. 2 depicts a computed tomography (CT) scan, including both image and overlay graphics aspects, of the type suitable for rendering by a system according to the invention.

By way of brief digression, FIG. 2 is an example of an image—here, an image that forms part of a user interface 28—of the type generated by the graphics application 18*e*3 on a client computer, e.g., 18, with rendering by the local processing resources and/or the render server. That user interface 28 includes an image 30, shown here as a central frame within the user interface. The image includes an image aspect comprising an MPR image of a patient's legs 32. It also includes an overlay graphics aspect comprising patient data text 34, a scout rectangle 36 for designating cropping regions, a measurement line 38, and an elliptical annotation 40.

Of course, the invention is not limited to use with images that form user interfaces, nor with images of the type shown in FIG. 2, nor to images having two aspects. Indeed, in the latter regard, the invention can be used with images that have only a single aspect or that have three or more aspects. Without loss of generality and for sake of convenience an image having two or more aspects (e.g., image 30 of FIG. 2) is sometimes referred to herein as a "composite image" and, at other times, simply, as an "image."

Figure 3:
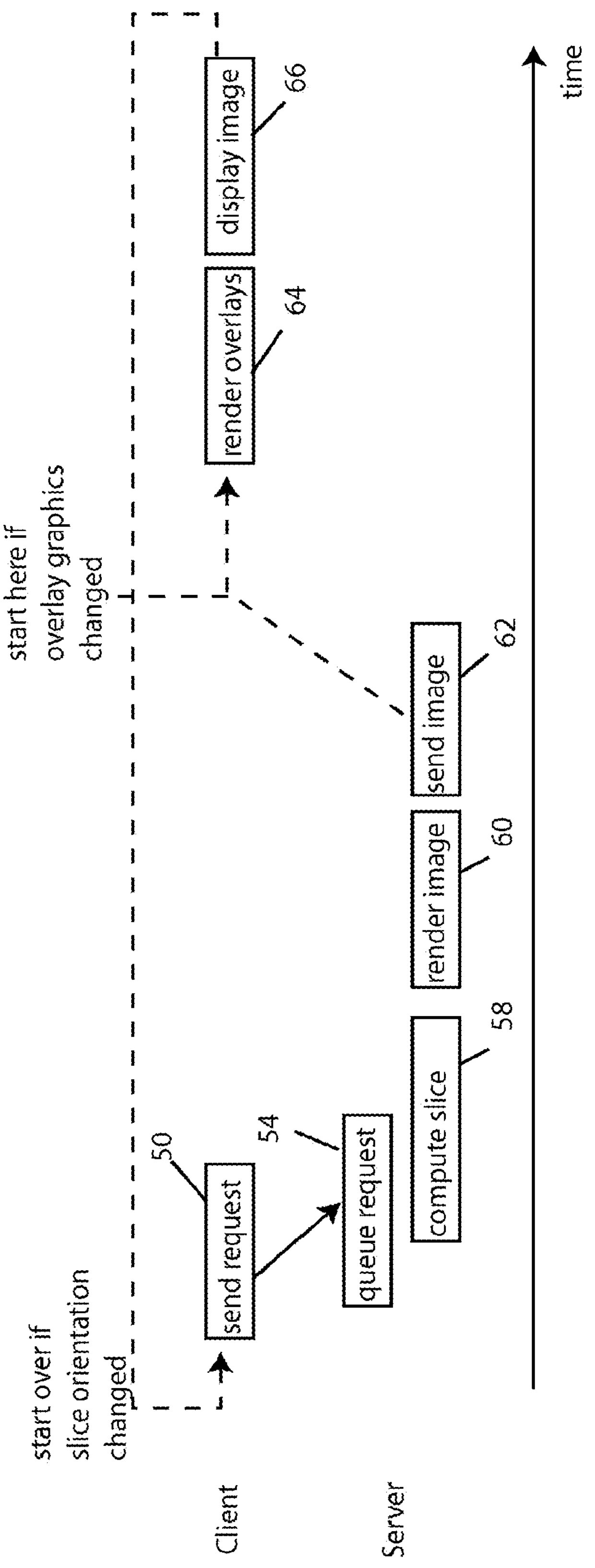
FIG. 3 is a data-flow diagram depicting rendering of an image of the type shown in FIG. 2 in a system according to the invention.

FIG. 3 is a data-flow diagram depicting one example of how the Client Software and, particularly, the render module 18*e*2*b*, can allocate rendering in response to requests by application 18*e*3 in regard to a (composite) image 30 of the type shown in FIG. 2. The particular allocation shown in FIG. 3A can be made, for example, on grounds that (a) the image aspect is relatively unchanging static (barring, for example, a new "slice" selection by the user) and is based on data already present on the server, and (b) the overlay graphics aspect is dynamic (e.g., changing as the user alters UT elements by moving the mouse, strikes keys on the keyboard, etc.).

FIG. 3, which shows time proceeding from left to right, depicts the Client Software and, particularly, the render module 18*e*2*b*, messaging the server 11 with a render request (see, step 50) in response to a render request pertaining to image aspects of a composite image by application 18*e*3. In response, the server 11 queues the request (step 54), computes the respective image slice (step 58) and renders the image aspect (step 60), which it subsequently returns to the render module 18*e*2*b* (step 62), which can paste the image into a back buffer (not shown) or other storage area. Having once received the image aspect rendered by the server, the render module 18*e*2*b* renders the overlay graphics aspect (step 64) of the composite image, e.g., onto the back buffer, again, in response to a render request by the application 18*e*3, and displays the resulting back buffer image (step 66) and/or makes it available to the Client Software (e.g., application 18*e*3) for further processing. When adding the overlay graphics aspect to the back buffer, the render module 183*e*2*b* can insure that those graphics match the state of the application 18*e*3 (and, specifically, for example, the state of the image aspects) at the time server was messaged to render the image aspects.

As indicated in FIG. 3, after the resulting image is rendered, the render module 18*e*2*b* can re-render the overlay graphics aspects, e.g., in response to the user moving the mouse, striking keys on the keyboard or otherwise taking steps that effect the overlay graphics, without calling on the server 11 to re-generate the image aspects. (See, the notation "start here if 'overlay graphics' changed.") Conversely, if the user selects another slice to render, the render module 18*e*2*b* can re-message the server 11 to re-render the image aspect of the composite image and can re-render the overlay graphics aspects (See the notation "start over if slice orientation changed.")

Figure 4A:
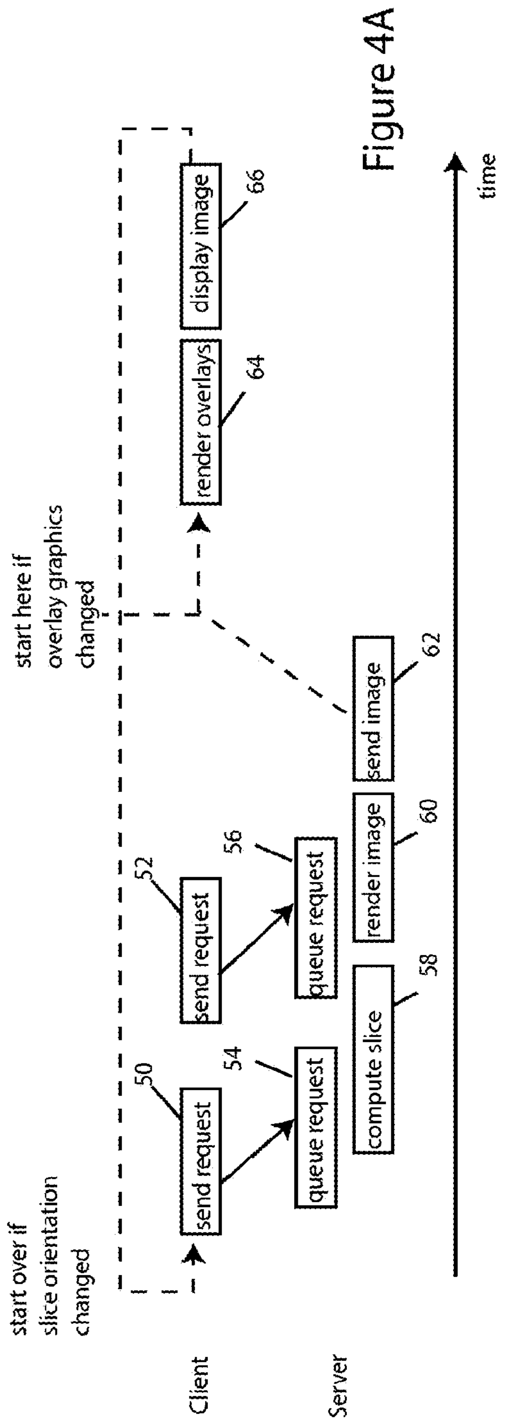
FIGS. 4A-4B are data-flow diagrams depicting alternate allocations of rendering tasks between client and server computers in rendering of an image of the type shown in FIG. 2 in a system according to the invention.
Figure 4B:
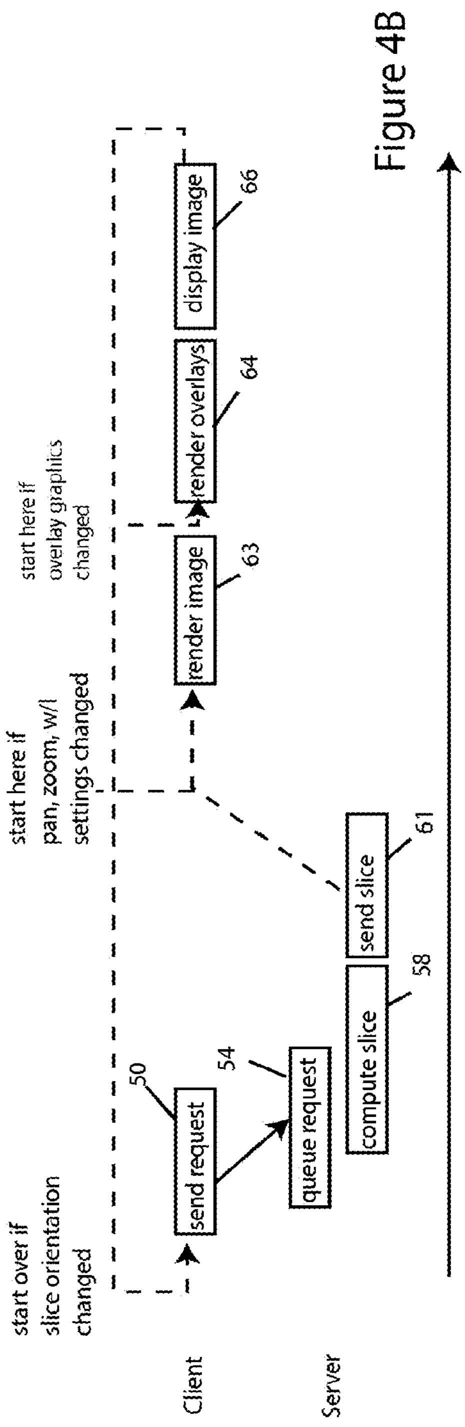

FIGS. 4A-4B are data-flow diagrams of another example of how the Client Software and, particularly, the render module 18*e*2*b*, can allocate rendering in response to requests by application 18*e*3 in regard to a composite image 30 of the type shown in FIG. 2—here, in connection with an image whose perspective aspect (i.e., zoom factor, panning position, or window/level setting) is changed, e.g., by user request.

As indicated by their use of similar elemental designations, FIGS. 4A-4B generally depict a data-flow like that shown in FIG. 3 and discussed above. The particular allocation of labor (as between the local resources and the render server) reflected in FIGS. 4A-4B is based on the grounds discussed above in connection with FIG. 3, as well as on the potentially changing perspective aspect of the composite image being rendered. Particularly, FIG. 4A shows such an allocation where the application 18*e*3 makes less frequent changes to zoom factor, panning position, window/level setting, or other perspective aspects. FIG. 4B, on the other hand, shows the allocation where the application 18*e*3 makes more frequent changes.

Referring to FIG. 4A, the Client Software and, particularly, the render module 18*e*2*b*, messages the server 11 with render requests (see, steps 50, 52) in response to render request pertaining to image and perspective aspects of the composite image by application 18*e*3. In response, the server 11 queues the requests (steps 54, 56), computes the respective image slice (step 58) and renders the image and perspective aspects (step 60), which it subsequently returns to the render module 18*e*2*b* (step 62) for temporary storage in a back buffer, or otherwise. Having once received the image aspect rendered by the server, the render module 18*e*2*b* renders the overlay graphics aspect (step 64), e.g., on top of the back buffer, again, in response to a render request by the application 18*e*3, and displays the resulting image (step 66) and/or makes it available to the Client Software (e.g., application 18_e_3) for further processing. As above, when adding the overlay graphics aspect to the back buffer, the render module 183_e_2_b_ can insure that those graphics match the state of the application 18_e_3 (and, specifically, for example, the state of the image aspects) at the time server was messaged to render the image aspects.

As above, after the resulting image is rendered, the render module 18_e_2_b_ can re-render the overlay graphics aspects, e.g., in response to the user moving the mouse, striking keys on the keyboard or otherwise taking steps that effect the overlay graphics, without calling on the server 11 to re-render the image and perspective aspects. (See, the notation "start here if overlay graphics changed."). Conversely, in response if the user selects another orientation (e.g., another slice to render and/or changes the view perspective), the render module 18_e_2_b_ re-messages the server 11 to re-render both the image and perspective aspects (See, the notation "start over if slice orientation changed.")

If the user repeatedly modifies the perspective, the render module 18_e_2_b_ can allocate processing of both the perspective aspect and the overlay graphics aspect to the local processing resources to avoid repeated network roundtrips. This is reflected in FIG. 4B.

To this end, and with reference to FIG. 4B, before the given client computer, e.g., 18, can process the perspective aspect, it must request the slice from server 11. Once having obtained the image slice, the client computer can process perspective aspects and overlay graphics aspects for that image slice. Only, if the slice orientation changes, does the render module 18_e_2_b_ have to message server 11 to compute the new slice; otherwise, the render module 18_e_2_b_ can perform perspective and/or overlay graphics rendering using image slice data previously provided by the server.

More particularly, referring to FIG. 4B, the Client Software and, particularly, the render module 18_e_2_b_, messages the server 11 with a render request (see, step 50) in response to image render requests by application 18_e_3. In response, the server 11 queues the request (step 54), computes the respective image slice (see step 58) and sends it back to the client (step 61). Having once received the slice generated by the server 11, the render module 18_e_2_b_ renders the corresponding image aspect from the perspective (e.g., zoom, pan, window level setting) chosen by the user or otherwise requested by the application 18_e_3 (step 63). The render module 18_e_2_b_, further, renders the overly graphics aspect (step 64), again, in response to a render request by the application 18_e_3, and displays the resulting image (step 66).

As indicated in FIG. 4, after the resulting image is rendered, the render module 18_e_2_b_ can re-render the perspective and overlay graphics aspects, e.g., in response to the user (and application 18_e_3) changing the zoom, pan, window level-setting, without calling on the server 11 to re-generate the slice. (See the notation "start here if zoom, pan, w/l changed"). Moreover, the render module 18_e_2_b_ can re-render the overlay graphics aspects, e.g., in response to the user (and application 18_e_3) moving the mouse, striking keys on the keyboard or otherwise taking steps that effect the overlay graphics, without calling on the server 11 to regenerate the slice or using local resources to re-render the image aspects. Conversely, in response if the user selects another slice to render, the render module 18_e_2_b_ can re-message the server 11 to re-render the slice and, thereby, to restart the rendering process (See the notation "start over if slice orientation changed.")

Figure 5:
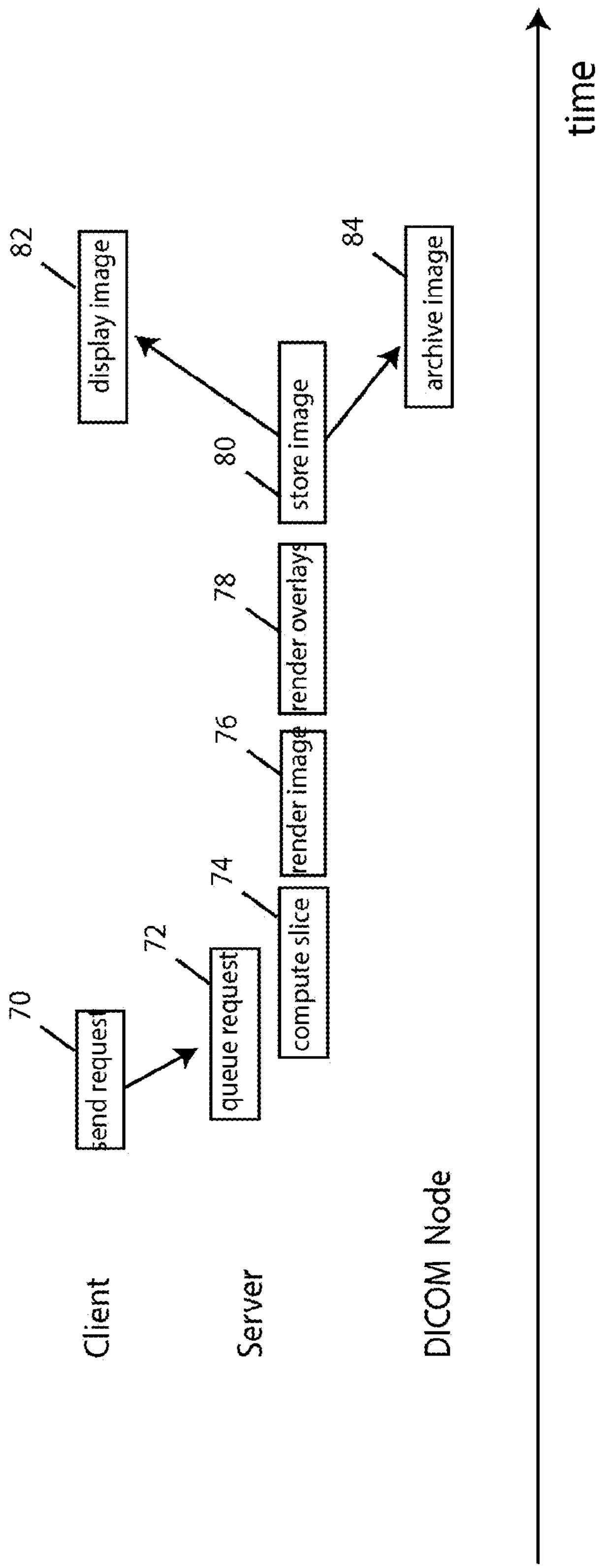
FIG. 5 is a data-flow diagram depicting an allocation of rendering tasks between client and server computers in rendering an image of a movie, video or other "moving picture" sequence in a system according to the invention

Though FIGS. 3 and 4B illustrates rendering of image aspects on the server 11 and overlay graphics and/or perspective aspects on a given client computer, e.g., 18, it will be appreciated that the render module 18_e_2_b_ can cause the entirety of aspects of an image to be rendered on the server (or, conversely, on the client), e.g., as illustrated in FIG. 5. Such might be the case, by way of non-limiting example, in rendering a movie, video or other image sequence including both image aspects and overlay graphics aspects, where the resulting file is to be stored on the server, possibly, for transfer to other servers. In such an instance, by way of non-limiting example, the Client Software and, particularly, the render module 18_e_2_b_, can message the server 11 with a render request (see, step 70) in response to a request from application 18_e_3, e.g., to render an image from the movie sequence. In response, the server 11 queues the request (step 72), computes the respective image slice (step 74), renders the slice image (step 76) and the overlay (step 78), stores the resulting image (step 80) and sends a copy back to the client for display (step 82). At the same time, the server can send a copy of the image to a DICOM node for archival storage (step 84).

Described above are methods and systems meeting the desired objects, among others. It will be appreciated that the embodiments shown and described herein are merely examples of the invention and that other embodiments, incorporating changes therein may fall within the scope of the invention.

The invention claimed is:

1. A method comprising:

receiving at a server a first rendering request for a first image from a client computer at a $t_1$ (first time), the client computer comprising a client digital data processor, a client memory, a display device, a first graphics board, a first graphics memory, a first graphics processing unit, where the client computer has access to a back buffer, the server comprising a server memory, a second graphics board, a second graphics memory, a second graphics processing unit, one or more server processing units coupled to the server memory, where the server has access to the back buffer, where a render module is running on the server, where in response to the first rendering request, the render module carries out steps comprising:

(a) identifying a $s_1$ (internal state of the first graphics processing unit) at the $t_1$;

(b) dividing the first rendering request for the first image into at least a first perspective aspect and a first overlay aspect;

(c) allocating the rendering of the first overlay aspect to the client computer;

(e) rendering the first perspective aspect using the second graphics board at a $t_2$ (second time); and (d) identifying a $s_2$ (internal state of the first graphics processing unit) at the $t_2$, where if the $s_2$ equals the $s_1$, then the render module sends the first perspective aspect to the client computer, where a first composite image comprises the first perspective aspect and the first overlay aspect, where the first composite image is adapted for display on the display device.

2. The method of claim 1, where the first overlay aspect is a textual element.

3. The method of claim 2, where the textual element comprises a patient data.

4. The method of claim 1, where the first overlay aspect is a graphical element.

5. The method of claim 4, where the graphical element is selected from the group consisting of a ruler, a registration and a cross-hair'.

6. The method of claim 1, further comprising where the render module sends the first perspective aspect to the back buffer.

7. The method of claim 1, where the render module compares the $s_2$ to the $s_1$ to ensure the first composite image is a match for the first image requested at the $t_1$.

8. The method of claim 1, further comprising where the render module compares the $s_2$ to the $s_1$ to ensure the first perspective aspect is a match for the first image requested at the $t_1$.

9. The method of claim 1, further comprising where the first composite image is stored in the back buffer.

10. The method of claim 1, further comprising where the render module in response to the first rendering request sends the first composite image to the client computer.

11. The method of claim 1, further comprising where the render module displays the first composite image.

12. A method comprising:

receiving at a server a first rendering request for a first image from a client computer at a t1 (first time), the client computer comprising a client digital data processor, a client memory, a display device, a first graphics board, a first graphics memory, a first graphics processing unit and access to a back buffer, the server comprising a server memory, a second graphics board, a second graphics memory, a second graphics processing unit, one or more server processing units coupled to the server memory, where the server has access to the back buffer, where a render module is running on the server, where in response to the first rendering request, the render module carries out steps comprising:

(a) identifying a s1 (internal state of the first graphics processing unit) at the t1;

(b) dividing the first rendering request for the first image into at least a first perspective aspect and a first overlay aspect;

(c) allocating the rendering of the first overlay aspect to the client computer;

(d) rendering the first perspective aspect using the second graphics board at a t2 (second time);

(e) identifying a s2 (internal state of the first graphics processing unit) at the t2;

(f) insuring the $s_2$ equals the $s_1$; and (g) sending the first perspective aspect to the client computer, where a first composite image comprises the first perspective aspect and the first overlay aspect, where the first composite image is adapted for display on the display device.

13. The method of claim 12, where the first overlay aspect is a textual element.

14. The method of claim 13, where the textual element comprises a patient data.

15. The method of claim 12, where the first overlay aspect is a graphical element.

16. The method of claim 15, where the graphical element is selected from the group consisting of a ruler, a registration and a cross-hair'.

17. The method of claim 12, further comprising where the render module sends the first perspective aspect to the back buffer.

18. The method of claim 1, further comprising where the first composite image is stored in the back buffer.

19. The method of claim 12, further comprising where the render module in response to the first rendering request sends the first composite image to the client computer.

20. The method of claim 12, further comprising where the render module displays the first composite image.

* * * * *